US006228965B1

United States Patent
Muta et al.

(10) Patent No.: US 6,228,965 B1
(45) Date of Patent: May 8, 2001

(54) THERMALLY CONDUCTIVE PRESSURE-SENSITIVE ADHESIVE AND ADHESIVE SHEET CONTAINING THE SAME

(75) Inventors: Shigeki Muta; Masahiro Ohura; Takao Yoshikawa, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/319,105

(22) PCT Filed: Nov. 19, 1997

(86) PCT No.: PCT/JP97/04217

§ 371 Date: Jun. 1, 1999

§ 102(e) Date: Jun. 1, 1999

(87) PCT Pub. No.: WO98/23700

PCT Pub. Date: Apr. 6, 1998

(30) Foreign Application Priority Data

Nov. 29, 1996 (JP) .................................................. 8-319438

(51) Int. Cl.[7] .................................................. C08F 220/10
(52) U.S. Cl. .................. 526/328.5; 526/320; 526/328; 428/461; 428/473.5; 428/5; 428/475.8; 428/476.3; 428/483
(58) Field of Search .................. 526/320, 328, 526/328.5; 428/461, 473.5, 475.8, 476.3, 483

(56) References Cited

U.S. PATENT DOCUMENTS

| 5,194,550 | * 3/1993 | Rance et al. | 526/318.25 |
| 5,213,868 | 5/1993 | Liberty et al. | 428/131 |
| 5,298,791 | 3/1994 | Liberty et al. | 257/707 |
| 5,502,085 | 3/1996 | Ohura et al. | 522/106 |

FOREIGN PATENT DOCUMENTS

| 0 566 093 A1 | 4/1993 | (EP) . |
| 55-3488 | 1/1980 | (JP) | C09D/3/81 |
| 64-33175 | 2/1989 | (JP) | C09J/3/14 |
| 4-114075 | 4/1992 | (JP) | C09J/7/02 |
| 6-88061 | 3/1994 | (JP) | C09J/133/08 |

OTHER PUBLICATIONS

International Search Report.

* cited by examiner

Primary Examiner—Helen L. Pezzuto
(74) Attorney, Agent, or Firm—Sughrue, Mion, Zinn, Macpeak & Seas, PLLC

(57) ABSTRACT

An adhesive sheet (2) in which heat-conductive and pressure-sensitive adhesive layers (22, 23) which comprise a) a copolymer of a monomer mixture containing main monomers comprising as main component an alkyl (meth) acrylate carrying an alkyl group having from 2 to 14 carbon atoms on average and from 1 to 30% by weight, based on the above main monomers, of a polar monomer having a glass transition point, as a homo-polymer, of ° C. or lower; and b) from 10 to 300 parts by weight, per 100 parts by weight of the copolymer, of a heat-conductive filler are formed on both surfaces of a heat-conductive base material (21) is inserted between an electronic part (1) and a heat-radiating member (3) to thereby adhere and fix the heat-radiating member (3) to the electronic part (1) while providing a high heat-conductivity with the heat-conductive and pressure-sensitive adhesive layers (22, 23).

3 Claims, 1 Drawing Sheet

THERMALLY CONDUCTIVE PRESSURE-SENSITIVE ADHESIVE AND ADHESIVE SHEET CONTAINING THE SAME

TECHNICAL FIELD

This invention relates to heat-conductive and pressure-sensitive adhesives and adhesive sheets in the form of sheets, tapes, etc. wherein the heat-conductive and pressure-sensitive adhesives are located on heat-conductive base materials.

BACKGROUND ART

With an increase in integration of IC circuits, heat value is increased in electronic parts such as hybrid packages, multimodules, and sealed type integrated circuits with plastics and metals. Since the increase of temperature due to the increased heat value may cause malfunction of the electronic parts, a countermeasure for preventing the malfunction by attaching a heat-radiating member such as a heat sink to the electronic part has been taken.

As a method for providing electronic parts with heat-radiating members, a method which comprises using an adhesive prepared by adding aluminum powder etc. to a composition comprising a polymerizable acrylate monomer and a free radical initiator is proposed in U.S. Pat. No. 4,722,960. In this method, after the adhesive is applied onto one or both of the electronic part and the heat-radiating member, it is necessary to effect a curing treatment using a primer or blocking oxygen. Such an adhesion treatment needs a long time and much labor, and the materials to be adhered have to be fixed temporally until the completion of curing, thereby resulting in poor efficiency in producing the electronic devices.

In contrast thereto, it is proposed to use so-called heat-conductive and pressure-sensitive adhesive having both heat-conductivity and pressure-sensitivity. By using these heat-conductive and pressure-sensitive adhesives, electronic parts can be easily provided with heat-radiating members while needing neither a long time nor much labor. Since heat-radiating plates and semiconductor packages are made of metals or metal oxides in a highly polar surface state, it is necessary in this method to employ pressure-sensitive adhesives being highly adhesive thereto and showing excellent heat conductivity. However, few of the existing heat-conductive and pressure-sensitive adhesives can satisfy these requirements.

In acrylic pressure-sensitive adhesives, for example, it is expected that the adhesive strength to heat-radiating plates or semiconductor packages can be improved by using highly polar monomers (acrylic acid, etc.) in the step of synthesizing adhesive polymers. However, most of highly polar monomers have glass transition points, as a homopolymer, at ordinary temperature (20° C.) or higher. When such a monomer is used in a large amount, therefore, the glass transition point of the resultant polymer is elevated and thus the modulus of elasticity thereof is elevated at ordinary temperature at which adhesives are used in general. This increase in the modulus of elasticity prevents the adhesive from acquiring a contact area with a heat-radiating plate or a semiconductor package and thus adhesion should be performed under elevated pressure or at a high temperature. However, semiconductor packages in recent years, which have become highly integrated and delicate, frequently suffer from pin breakage or destruction of the packages per se during adhesion under high pressure. When adhesion is performed under low pressure so as to avoid these phenomena, any sufficient contact area can not be obtained and consequently the heat-conductivity and the adhesion are lowered, thus inducing malfunction or fall-off.

To overcome these problems, attempts are made to reduce the amount of highly polar monomers (acrylic acid, etc.) in the synthesis of adhesive polymers to thereby secure a sufficiently large contact area. In this case, however, the resultant adhesive shows a lowered adhesive strength to a heat-radiating plate or a semiconductor package and, as a result, suffers from the problems of fall-off, etc. too. In heat-conductive and pressure-sensitive adhesives of this type, it is a practice to add heat-conductive fillers to pressure-sensitive adhesives to thereby achieve high heat-conductivity. When these heat-conductive fillers are added in a small amount, the desired high heat-conductivity can be scarcely established. When these heat-conductive fillers are added in a large amount so as to improve the heat-conductivity, on the other hand, the adhesive strength to a heat-radiating plate, etc. is lowered and, as a result, there arise problems of fall-off, etc.

As described above, it is advantageous to use heat-conductive and pressure-sensitive adhesives since electronic parts can be easily provided with heat-radiating members thereby without needing a long time or much labor. However, there have been known few heat-conductive and pressure-sensitive adhesives so far which are highly adhesive to highly polar heat-radiating plates or semiconductor packages and have high heat-conductivity. Accordingly, it cannot be always concluded that malfunctions of electronic parts caused by temperature increase can be effectively prevented by providing heat-radiating members.

Under these circumstances, the present invention aims at providing heat-conductive and pressure-sensitive adhesives being excellent in adhesion and heat-conductivity and adhesive sheets thereof, more particularly, heat-conductive and pressure-sensitive adhesives by which heat-radiating members can be adhered and fixed to electronic parts while achieving a high heat-conductivity, even though adhesion is performed under such low pressure as to cause no breakage of the electronic parts, and thus the heat evolved in the electronic parts can be efficiently transferred to the heat-radiating members to thereby prevent malfunctions of the electronic parts caused by temperature increase without fail, and adhesive sheets with the use of these heat-conductive and pressure-sensitive adhesives.

DISCLOSURE OF THE INVENTION

To achieve the above-mentioned objects, the present inventors have conducted extensive studies. As a result, they have found out that by using an acrylic copolymer containing, as a copolymerization component, a specific polar monomer having a glass transition point, as a homopolymer, of 0° C. or lower, an excellent adhesion owing to the above monomer can be achieved while the glass transition point of the copolymer and the modulus of elasticity thereof at ordinary temperature are scarcely increased. They have further found out that a heat-conductive and pressure-sensitive adhesive produced by adding an appropriate amount of a heat-conductive filler to the above-mentioned copolymer is one excellent in adhesion and heat-conductivity by which, when a heat-radiating member is to be adhered and fixed to an electronic part with securing a sufficiently large contact area, the heat-radiating member can be adhered and fixed to the electronic part while achieving a high heat-conductivity, even though adhesion is performed under such low pressure as to cause no breakage of the electronic part. The present invention has been completed based on these findings.

Accordingly, the present invention relates to a heat-conductive and pressure-sensitive adhesive characterized by containing: a) a copolymer of a monomer mixture which contains main monomers comprising from 88 to 100% by weight of an alkyl (meth)acrylate carrying an alkyl group having from 2 to 14 carbon atoms on average and from 12 to 0% by weight of a monoethylenic unsaturated monomer copolymerizable therewith and from 1 to 30% by weight, based on the above main monomers, of a polar monomer having a glass transition point, as a homopolymer, of 0° C. or lower; and b) from 10 to 300 parts by weight, per 100 parts by weight of the above copolymer, of a heat-conductive filler (claims 1 and 2). The present invention also relates to adhesive sheets wherein layer(s) of the heat-conductive and pressure-sensitive adhesive of the above constitution are formed on one or both of the surfaces of a heat-conductive base material (claim 3).

BRIEF DESCRIPTION OF THE DRAWINGS

FIG. 1 is a diagram showing the sectional view of an electronic part and a heat-radiating member adhered and fixed to each other with the use of the adhesive sheet according to the present invention, while

BEST MODE FOR CARRYING OUT THE INVENTION

Figure 1:
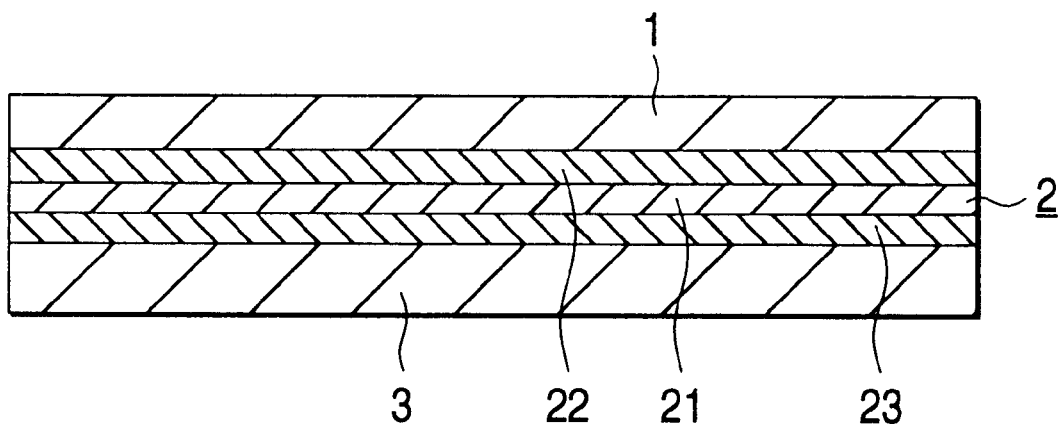

In the copolymer to be used as the component a) in the present invention, use is made of, as the main monomers, from 88 to 100% by weight, preferably form 94 to 99% by weight, of an alkyl (meth)acrylate carrying an alkyl group having from 2 to 14 carbon atoms on average and from 12 to 0% by weight, preferably from 6 to 1% by weight, of a monoethylenic unsaturated monomer copolymerizable therewith. The latter monoethylenic unsaturated monomer is optionally employed in order to delicately regulate the properties (adhesive strength, cohesive force, etc.) of the copolymer. However, use of this monoethylenic unsaturated monomer in an amount exceeding the level as defined above results in some troubles, for example, a reduced contact area due to an increase in the modulus of elasticity of the copolymer.

Examples of the alkyl (meth)acrylate carrying an alkyl group having from 2 to 14 carbon atoms on average to be used in the main monomers include butyl (meth)acrylate, isononyl (meth)acrylate, isooctyl (meth)acrylate and 2-ethylhexyl (meth)acrylate. Examples of the monoethylenic unsaturated monomer copolymerizable therewith include carboxyl-containing monomers such as acrylic acid, methacrylic acid and maleic acid, and nitrogen-containing monomers such as acrylamide, N-vinylpyrrolidone and acryloylmorpholine.

In the present invention, a polar monomer having a glass transition point (hereinafter referred to simply as Tg), as a homopolymer, of 0° C. or lower is employed to give a monomer mixture for producing a copolymer. This polar monomer is employed at a ratio of from 1 to 30% by weight, preferably from 5 to 20% by weight, based on the main monomers. When used in an amount less than 1% by weight, the polar monomer fails to contribute to the improvement in the adhesion or decrease in the Tg of the copolymer. When the content of the polar monomer exceeds 30% by weight, on the other hand, the adhesive strength and the cohesive force become out-of-balance, the heat resistance inherent in acrylic monomers, etc. are deteriorated and, as a result, there frequently arise troubles similar to those described above.

As the polar monomer as described above, it is preferable to use those having carboxyl group as a polar group in the molecule. Examples thereof include caprolactone-modified acrylate (ARONIX M-5300; manufactured by Toagosei Co., Ltd., $Tg \leq -50°$ C.), 2-acryloyloxyethylsuccinic acid (ARONIX M-5400; manufactured by Toagosei Co., Ltd., $Tg \leq -50°$ C.) and 2-acryloyloxyethylphthalic acid (ARONIX M-5500; manufactured by Toagosei Co., Ltd., $Tg \leq -40°$ C.). It is also preferable to use monomers having hydroxyl group as a polar group in the molecule. Examples thereof include caprolactone-modified hydroxyethyl (meth) acrylate (PLACCEL F Series; manufactured by Daicel Chemical Industries, Ltd., $Tg \leq -20°$ C.), 2-hydroxyethyl acrylate ($Tg = -15°$ C.), 2-hydroxypropyl acrylate ($Tg = -7°$ C.) and 2-hydroxyhexyl acrylate ($Tg \leq -15°$ C.).

The copolymer of the component a) in the present invention can be synthesized by subjecting the above-mentioned monomer mixture to copolymerization by various methods, for example, solution polymerization, emulsion polymerization, suspension polymerization, block polymerization or photopolymerization.

As the heat-conductive filler of the component b) in the present invention, use can be made of various metal powders and ceramics powders such as aluminum oxide, aluminum nitride, titanium dioxide, titanium boride, boron nitride, silicon nitride and carbon nitride. It is recommended that the heat-conductive filler is used in an amount of from 10 to 300 parts by weight, preferably from 20 to 120 parts by weight, per 100 parts by weight of the copolymer of the above-mentioned component a). When the content of the heat-conductive filler is less than 10 parts by weight, excellent heat-conductivity can be hardly obtained. On the other hand, it is undesirable that the content thereof exceeds 300 parts by weight, since the adhesivenss, etc. of the resultant adhesive is deteriorated in this case.

The heat-conductive and pressure-sensitive adhesive of the present invention, which contain the copolymer of the above-mentioned component a) and the heat-conductive filler of the above-mentioned component b) at the ratio as defined above, may further contain various known additives (fillers, pigments, age resistors, tackifiers, flame retardants, etc.), if needed. Moreover, it may contain external crosslinking agents (polyfunctional isocyanate compounds, polyfunctional epoxy compounds, etc.) to improve the retention characteristics of the pressure-sensitive adhesive. It is also possible, in the step of forming the copolymer of the above-mentioned component a) by photopolymerization, etc., to add polyfunctional (meth)acrylates as internal crosslinking agents. Examples of the polyfunctional(meth) acrylates include trimethylolpropane tri(meth)acrylate, pentaerythitol tetra (meth)acrylate, 1,2-ethyleneglycol di(meth) acrylate and 1,6-hexanediol di(meth)acrylate.

These external crosslinking agents and internal crosslinking agents can be used in an amount of from 0.05 to 5 parts by weight, preferably form 0.1 to 3 parts by weight, per 100 parts by weight of the sum of the copolymer of the above-mentioned component a) and the heat-conductive filler of the above-mentioned component b). When polyfunctional (meth) acrylates are to be used as internal crosslinking agents, it is recommended to use a bifunctional compound in a somewhat large amount but a trifunctional or higher compound in a somewhat small amount, each within the range as specified above. When such an external or internal crosslinking agent is used in an excessively small amount, no sufficient degree of crosslinkage can be achieved. As a result, the shape retention characteristics of the thus formed pressure-adhesive layer can be hardly improved. When such an additive is used in an excessively large amount, on the other hand, the modulus of elasticity of the resultant pressure-sensitive adhesive is elevated. In this case, the contact area is reduced and thus the heat-conductivity and adhesion are frequently deteriorated.

The adhesive sheets according to the present invention are in the form of sheets or tapes wherein layer(s) of the heat-conductive and pressure-sensitive adhesive as described above are formed on one or both of the surfaces of a heat-conductive base material. Examples of the heat-conductive base material include foils of metals (including alloys) having high heat-conductivity (aluminum, copper, stainless, beryllium copper, etc.), sheets made of polymers highly heat-conductive per se (heat-conductive silicone, etc.), and plastic films containing heat-conductive fillers. Examples of the plastic films include films made of heat-resistant polymers such as polyimide, polyethylene terephthalate, polyethylene naphthalate, polytetrafluoroethylene, polyether ketone, polyether sulfone, polymethylpentene, polyether imide, polysulfone, polyphenylene sulfide, polyamideimide, polyester imide and aromatic polyamide.

When the adhesive sheets of the present invention should be electrical insulating ones, it is particularly preferable to use such plastic films as those cited above as the heat-conductive base material. Among these plastic films, polyimide films or polyamide films are preferable from the viewpoint of heat-resistance. By taking the heat-conductivity into consideration, it s also preferable to use plastic films prepared by adding electrical insulating heat-conductive fillers to these films. Examples of the electrical insulating heat-conductive fillers include $SiO_2$, $TiB_2$, BN, $Si_3N_4$, $TiO_2$, MgO, NiO, CuO, $Al_2O_3$ and $Fe_2O_3$. Among these compounds, it is particularly preferable to use BN or $Al_2O_3$ which are highly heat-conductive and easily available. It is preferable that such an electrical insulating heat-conductive filler has an average particle size of usually from 1 to 250 $\mu$m, preferably from 1 to 100 $\mu$m and still preferably from 2 to 10 $\mu$m. The particles may be in any shape such as spheres, needles, flakes or stars. It is recommended that the electrical insulating heat-conductive filler is used in an mount of from 2 to 50% by volume, preferably from 10 to 35% by volume, in the film.

Although the thickness of the heat-conductive base material can be appropriately determined, it usually ranges from 10 to 125 $\mu$m, preferably from 25 to 100 $\mu$m, from the viewpoints of heat-resistance and heat-conductivity after forming the heat-conductive and pressure-sensitive adhesive layer(s). Similarly, the thickness of the heat-conductive and pressure-sensitive adhesive layer formed thereon can be appropriately determined, but usually ranges from 10 to 200 $\mu$m, preferably from 30 to 130 $\mu$m from the viewpoints of heat-resistance and heat-conductivity, though it may be determined appropriately. When the thickness thereof is 60 $\mu$m or more, it is desirable to employ bulk polymerization or photopolymerization (photopolymerization being particularly preferable) in the synthesis of the copolymer, by taking the adhesion and heat-conductivity into consideration.

The adhesive sheet of the present invention can be produced by applying the heat-conductive and pressure-sensitive adhesive onto a release liner, optionally followed by a polymerization treatment such as photopolymerization, to thereby form a layer of the above-mentioned pressure-sensitive adhesive, and then transferring this layer onto one or both of the surfaces of the heat-conductive base material. Alternatively, the above-mentioned heat-conductive and pressure-sensitive adhesive may be directly applied onto one or both of the surfaces of the heat-conductive base material, optionally followed by a polymerization treatment such as photopolymerization, to thereby form the heat-conductive and pressure-sensitive adhesive layers without using any release liner. An appropriate method may be selected depending on the type of the heat-conductive base material employed, etc.

In the present invention, when a heat-radiating member is to be adhered and fixed to an electronic part by using the above-mentioned heat-conductive and pressure-sensitive adhesive or an adhesive sheet thereof, the adhesive material is inserted between the electronic part and the heat-radiating member and adhesion is performed by taking advantage of the pressure-sensitive adhesion thereof. In this process, the heat-conductive and pressure-sensitive adhesive has a high adhesive strength and secures a sufficient adhered area owing to the appropriate modulus of elasticity thereof. Thus, strong adhesion/fixation can be established while providing a high heat-conductivity even under such low pressure as causing no damage in the electronic part, etc.

Figure 2:
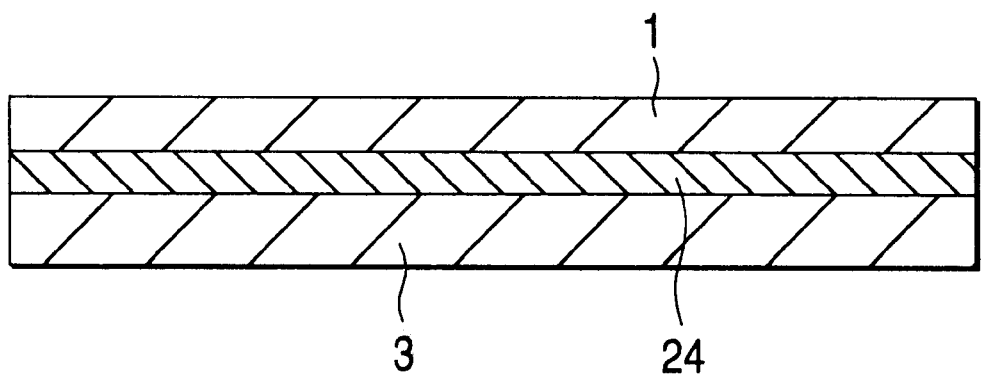
FIG. 2 is a diagram showing the sectional view of an electronic part and a heat-radiating member adhered and fixed to each other with the use of the heat-conductive and pressure-sensitive adhesive according to the present invention.

FIG. 1 shows an example of the above-mentioned adhesion/fixation, wherein an adhesive sheet (2) having heat-conductive and pressure-sensitive adhesive layers (22, 23) formed on both surfaces of a heat-conductive base material (21) is inserted between an electronic part (1) and a heat-radiating member (3) to thereby adhere and fix the heat-radiating member (3) to the electronic part (1) while providing a high heat-conductivity with the use of the heat-conductive and pressure-sensitive adhesive layers (22, 23) formed on both surfaces. FIG. 2 shows another example of the adhesion/fixation, wherein a heat-conductive and pressure-sensitive adhesive layer (24) is formed directly on one or both of an electronic part (1) and a heat-radiating member (3) (the heat-radiating member being preferable) by application, transferring, etc. to thereby adhere and fix the heat-radiating member (3) to the electronic part (1) while providing a high heat-conductivity. Examples of the electronic part to be adhered and fixed include IC tips, hybrid packages, multimodules, power transistors and sealed type integrated circuits made of plastics or metals. The present invention can be advantageously applied to the adhesion and fixation of electronic parts with a large heat value, for example, those employed in highly integrated circuits.

The heat-radiating members, i.e., another subject to be adhered and fixed, include heat sinks made of metal foils and sheets of aluminum, copper, etc. as cited above as examples of the materials of the heat-conductive base material, and radiators. The thickness of the heat sinks usually ranges from 10 $\mu$m to 10 mm, preferably from 50 $\mu$m to 5 mm, and still preferably from 100 $\mu$m to 3 mm, though the present invention is not restricted thereto. The radiators may have arbitrary structures, for example, those provided with cooling fans.

The heat-conductive and pressure-sensitive adhesives or adhesive sheets thereof according to the present invention may be used not only in adhering and fixing electronic parts to heat-radiating members as described above but also in fixing members in various fields including building materials, vehicles, aircrafts and ships. The heat-conductive and pressure-sensitive adhesives and adhesive sheets thereof can achieve the above-mentioned effects too when employed for these purposes.

To further illustrate the present invention in greater detail, the following Examples will be given wherein all parts are by weight.

EXAMPLE 1

85 parts of 2-ethylhexyl acrylate, 5 parts of acrylic acid and 10 parts of caprolactone-modified acrylate (ARONIX M-5300; manufactured by Toagosei Co., Ltd., Tg≦−50° C.) were subjected to solution polymerization in 210 parts of ethyl acetate in the coexistence of 0.4 parts of 2,2-azobisisobutyronitrile while stirring at 60 to 80° C. under nitrogen replacement to give a copolymer solution having a viscosity of about 120 P, a degree of polymerization of 99.2% by weight and a solid content of 30% by weight. To this solution were added 3 parts, per 100 parts of the copolymer, of a polyfunctional isocyanate crosslinking agent and 40 parts of boron nitride (BN) followed by well mixing. Thus, a heat-conductive and pressure-sensitive adhesive was prepared.

Next, a polyester film having been surface-treated with a releasing agent was employed as a release liner. The heat-conductive and pressure-sensitive adhesive prepared above was applied onto the release liner and dried in a hot-air dryer at 40° C. for 5 minutes and then at 130° C. for additional 5 minutes to thereby form a heat-conductive and pressure-sensitive adhesive layer of 50 $\mu$m in thickness. This layer was transferred onto the both surfaces of an aluminum foil (thickness: 30 $\mu$m) employed as the heat-conductive base material. Thus, an adhesive sheet of 130 $\mu$m in total thickness was obtained.

EXAMPLE 2

A premix comprising 66 parts of isononyl acrylate, 20 parts of butyl acrylate, 4 parts of acrylic acid, 10 parts of the same caprolactone-modified acrylate as the one employed in Example 1 and 0.1 part of 2,2-dimethoxy-2-phenylacetophenone (photopolymerization initiator) was partly polymerized by exposing to UV light in a nitrogen atmosphere to thereby give a syrup having a viscosity of about 4,000 cP which was usable in application coating. To 100 parts of this syrup were added 0.2 parts of trimethylolpropane triacrylate (crosslinking agent) and 40 parts of boron nitride (BN) and the resultant mixture was well mixed to thereby give a photopolymerizable composition.

Next, a polyester film having been surface-treated with a releasing agent was employed as a release liner. The photopolymerizable composition prepared above was applied onto the release liner and subjected to photopolymerization by UV-irradiating in a nitrogen atmosphere with a high-pressure mercury lamp having a light intensity of 5 mW/cm$^2$ at 900 mj/cm$^2$. Then it was dried in a hot-air dryer at 130° C. for 5 minutes to thereby form a heat-conductive and pressure-sensitive adhesive layer of 50 $\mu$m in thickness. This layer was transferred onto the both surfaces of an aluminum foil (thickness: 30 $\mu$m) employed as the heat-conductive base material. Thus, an adhesive sheet of 130 $\mu$m in total thickness was obtained.

EXAMPLE 3

An adhesive sheet was prepared in the same manner as in Example 2 except for using 100 parts of boron nitride in the photopolymerizable composition.

EXAMPLE 4

An adhesive sheet was prepared in the same manner as in Example 2 except for using, as a monomer mixture, 64 parts of isononyl acrylate, 1 part of acrylic acid and 15 parts of the same caprolactone-modified acrylate as the one employed in Example 1.

EXAMPLE 5

A premix comprising 66 parts of isooctyl acrylate, 20 parts of butyl acrylate, 4 parts of acryloylmorpholine, 10 parts of 2-acryloyloxyethylsuccinic acid (ARONIX M-5400; manufactured by Toagosei Co., Ltd., Tg≦−50° C.) and 0.1 part of 2,2-dimethoxy-2-phenylacetophenone (photopolymerization initiator) was partly polymerized by exposing to UV light in a nitrogen atmosphere to thereby give a syrup having a viscosity of about 4,000 cP which was usable in application coating. To 100 parts of this syrup were added 0.2 parts of trimethylolpropane triacrylate (crosslinking agent) and 40 parts of boron nitride and the resultant mixture was well mixed to thereby give a photopolymerizable composition.

Next, a polyester film having been surface-treated with a releasing agent was employed as a release liner. The photopolymerizable composition prepared above was applied onto the release liner and subjected to photopolymerization by UV-irradiating in a nitrogen atmosphere with a high-pressure mercury lamp having a light intensity of 5 mW/cm$^2$ at 900 mj/cm$^2$. Then it was dried in a hot-air dryer at 130° C. for 5 minutes to thereby form a heat-conductive and pressure-sensitive adhesive layer of 50 $\mu$m in thickness. This layer was transferred onto the both surfaces of an aluminum foil (thickness: 30 $\mu$m) employed as the heat-conductive base material. Thus, an adhesive sheet of 130 $\mu$m in total thickness was obtained.

EXAMPLE 6

95 parts of 2-ethylhexyl acrylate, 5 parts of acrylic acid and 10 parts of caprolactone-modified acrylate (ARONIX M-5300; manufactured by Toagosei Co., Ltd. , Tg≦−50° C.) were subjected to solution polymerization in 210 parts of ethyl acetate in the coexistence of 0.4 parts of 2,2-azobisisobutyronitrile while stirring at 60 to 80° C. under nitrogen replacement to give a copolymer solution having a viscosity of about 120 P, a degree of polymerization of 99.2% by weight and a solid content of 30% by weight. To this solution were added 3 parts, per 100 parts of the copolymer, of a polyfunctional isocyanate crosslinking agent and 40 parts of boron nitride (BN) followed by well mixing. Thus, a heat-conductive and pressure-sensitive adhesive was prepared.

Next, a polyester film having been surface-treated with a releasing agent was employed as a release liner. The heat-conductive and pressure-sensitive adhesive prepared above was applied onto the release liner and dried in a hot-air dryer at 40° C. for 5 minutes and then at 130° C. for additional 5 minutes to thereby form a heat-conductive and pressure-sensitive adhesive layer of 50 $\mu$m in thickness.

EXAMPLE 7

A premix comprising 66 parts of isooctyl acrylate, 20 parts of butyl acrylate, 4 parts of acryloylmorpholine, 10 parts of 2-acryloyloxyethylsuccinic acid (ARONIX M-5400; manufactured by Toagosei Co., Ltd., Tg≦−50° C.) and 0.1 part of 2,2-dimethoxy-2-phenylacetophenone (photopolymerization initiator) was partly polymerized by exposing to UV light in a nitrogen atmosphere to thereby give a syrup having a viscosity of about 4,000 cP which was usable in application coating. To 100 parts of this syrup were added 0.2 parts of trimethylolpropane triacrylate (crosslinking agent) and 100 parts alumina ($Al_2O_3$) and the resultant mixture was well mixed to thereby give a photopolymerizable composition.

Next, this photopolymerizable composition was applied onto one surface of a polyimide film (thickness: 25 μm) containing about 17% by volume of $Al_2O_3$ and subjected to photopolymerization by UV-irradiating in a nitrogen atmosphere with a high-pressure mercury lamp having a light intensity of of 5 mW/cm² at 900 mj/cm². Then it was dried in a hot-air dryer at 130° C. for 5 minutes to thereby give an adhesive sheet (total thickness: 75 μm) having a heat-conductive and pressure-sensitive adhesive layer of 50 μm in thickness.

EXAMPLE 8

An adhesive sheet (total thickness: 125 μm) was prepared in the same manner as in Example 7 except for applying the photopolymerizable composition onto the both surfaces of the polyimide film (thickness: 25 μm) containing about 17% by volume of $Al_2O_3$.

EXAMPLE 9

An adhesive sheet (total thickness 130 μm) was prepared in the same manner as in Example 5 except for using caprolactone-modified hydroxyethyl acrylate (PLACCEL F Series; manufactured by Daicel Chemical Industries, Ltd., Tg ≦ −20° C.) as a substitute for the 2-acryloyloxyethylsuccinic acid employed as a monomer having a glass transition point, as a homopolymer, of 0° C. or lower.

COMPARATIVE EXAMPLE 1

A premix comprising 67 parts of isooctyl acrylate, 30 parts of butyl acrylate, 3 parts of acrylic acid and 0.1 part of 2,2-dimethoxy-2-phenylacetophenone (photopolymerization initiator) was partly polymerized by exposing to UV light in a nitrogen atmosphere to thereby give a syrup having a viscosity of about 4,000 cP which was usable in application coating. To 100 parts of this syrup were added 0.2 parts of trimethylolpropane triacrylate (crosslinking agent) and 40 parts of boron nitride and resultant mixture was well mixed to thereby give a photopolymerizable composition.

Next, this photopolymerizable composition was applied onto a polyester film employed as a release liner and having been surface-treated with a releasing agent and subjected to photopolymerization by UV-irradiating in a nitrogen atmosphere with a high-pressure mercury lamp having a light intensity of of 5 mW/cm² at 900 mj/cm². Then it was dried in a hot-air dryer at 130° C. for 5 minutes to thereby form a heat-conductive and pressure-sensitive adhesive layer of 50 μm in thickness. Next, this layer was transferred onto the both surfaces of an aluminum foil (thickness: 30 μm) employed as a heat-conductive base material to thereby give an adhesive sheet of 130 μm in total thickness.

COMPARATIVE EXAMPLE 2

An adhesive sheet was prepared in the same manner as in Example 2 except for using, as a monomer mixture, 65 parts of isooctyl acrylate, 20 parts of butyl acrylate and 15 parts of acrylic acid.

COMPARATIVE EXAMPLE 3

A premix comprising 77 parts of butyl acrylate, 20 parts of isobornyl acrylate, 3 parts of acrylic acid and 0.1 part of 2,2-dimethoxy-2-phenylacetophenone (photopolymerization initiator) was partly polymerized by exposing to UV light in a nitrogen atmosphere to thereby give a syrup having a viscosity of about 4,000 cP which was usable in application coating. To 100 parts of this syrup were added 0.2 parts of trimethylolpropane triacrylate (crosslinking agent) and 40 parts of boron nitride and resultant mixture was well mixed to thereby give a photopolymerizable composition.

Next, this photopolymerizable composition was applied onto a polyester film employed as a release liner and having been surface-treated with a releasing agent and subjected to photopolymerization by UV-irradiating in a nitrogen atmosphere with a high-pressure mercury lamp having a light intensity of of 5 mW/cm2 at 900 mj/cm². Then it was dried in a hot-air dryer at 130° C. for 5 minutes to thereby form a heat-conductive and pressure-sensitive adhesive layer of 50 μm in thickness. Next, this layer was transferred onto the both surfaces of an aluminum foil (thickness: 30 μm) employed as a heat-conductive base material to thereby give an adhesive sheet of 130 μm in total thickness.

COMPARATIVE EXAMPLE 4

A premix comprising 95 parts of butyl acrylate, 5 parts of acrylic acid and 0.1 part of 2,2-dimethoxy-2-phenylacetophenone (photopolymerization initiator) was partly polymerized by exposing to UV light in a nitrogen atmosphere to thereby give a syrup having a viscosity of about 4,000 cP which was usable in application coating. To 100 parts of this syrup were added 0.2 parts of trimethylolpropane triacrylate (crosslinking agent) and 400 parts of boron nitride and resultant mixture was well mixed to thereby give a photopolymerizable composition.

Next, this photopolymerizable composition was applied onto a polyester film employed as a release liner and having been surface-treated with a releasing agent and subjected to photopolymerization by UV-irradiating in a nitrogen atmosphere with a high-pressure mercury lamp having a light intensity of of 5 mW/cm² at 900 mj/cm². Then it was dried in a hot-air dryer at 130° C. for 5 minutes to thereby form a heat-conductive and pressure-sensitive adhesive layer of 50 μm in thickness. Next, this layer was transferred onto the both surfaces of an aluminum foil (thickness: 3 μm) employed as a heat-conductive base material to thereby give an adhesive sheet of 130 μm in total thickness.

The adhesive sheets prepared in the above Examples 1 to 8 and Comparative Examples 1 to 4 were each subjected to the following adhesion strength test and heat resistance test. Table 1 summarizes the results.

<Adhesive strength test>

A polyester film of 25 μm in thickness was adhered to one face of an adhesive sheet to thereby give a test tape of 20 mm in width and 100 mm in length. Then, this test tape was placed on a polished stainless plate and adhered thereto by pressing down with a 2 kg roller reciprocally. After aging at 23° C. under a relative humidity of 65% for 30 minutes, the test tape was peeled off at an angle of 180° at a tensile speed of 300 mm/min with the use of a peeling test machine at 23° C. under a relative humidity of 65% to thereby examine the adhesive strength.

In the case of the adhesive sheet of Example 7, the adhesive strength was measured without adhering to a polyester film.

<Heat resistance test>

By using an adhesive sheet, a transistor in a TO-220 package was adhered or clipped and fixed under a contact bonding pressure of 1 kg/cm² to a heat sink which had been immersed in water to obtain a constant temperature. Then a definite output was supplied to the transistor and the difference (T2−T1) in the transistor temperature (T2) from the temperature of the lower surface of the adhesive sheet (T1) was measured. Next, the heat resistance was calculated in accordance with the following formula.

$$\text{Heat resistance (° C.·cm}^2\text{/W)} = (T2-T1) \times A/P$$

A: transistor area (cm²)

P: electrical power (W) consumed by transistor.

The transistor temperature (T2) was measured by using a thermocouple spot welded to the metallic base of the transistor package. On the other hand, the temperature of the lower surface of the adhesive sheet (T1) was measured by forming a small hole in the heat sink and inserting a thermocouple thereinto. The thermocouple was placed in the heat sink such that it did not give influence onto the adhered area of the adhesive sheet, with the proviso that the location of the thermocouple was as near as possible. A smaller value means the higher heat-conductivity.

TABLE 1

|  | Adhesive strength (gf/20 mm width) | Heat resistance (° C. · cm²/W) |
| --- | --- | --- |
| Ex. 1 | 1,200 | 4.5 |
| Ex. 2 | 1,800 | 5.0 |
| Ex. 3 | 1,300 | 1.5 |
| Ex. 4 | 2,200 | 3.3 |
| Ex. 5 | 1,500 | 3.0 |
| Ex. 6 | 680 | 2.9 |
| Ex. 7 | 1,200 | 3.5 |
| Ex. 8 | 1,500 | 4.2 |
| Ex. 9 | 1,200 | 3.6 |
| Comp. Ex. 1 | 500 | 3.3 |
| Comp. Ex. 2 | 1,500 | 9.0 |
| Comp. Ex. 3 | 300 | 12.0 |
| Comp. Ex. 4 | 100 | 3.0 |

As the results given in the above Table 1 clearly show, the adhesive sheets of Examples 1 to 8 according to the present invention each showed a high adhesive strength (not less than 600 gf/20 mm width) and a small heat resistance (not more than 5.0° C. ·cm²/W), which indicates that these adhesive sheets were very excellent in adhesion and heat-conductivity.

Industrial Applicability:

As described above, the present invention can provide heat-conductive and pressure-sensitive adhesives being excellent in adhesion and heat-conductivity by which heat-radiant members can be well adhered and fixed to electronic parts while achieving a high heat-conductivity, even though adhesion is performed under such low pressure as to cause no breakage of the electronic parts, and adhesive sheets thereof by adding a heat-conductive filler to an acrylic copolymer containing, as a copolymerization component, a polar monomer having a glass transition point, as a homopolymer, of 0° C. or lower.

What is claimed is:

1. A heat-conductive and pressure-sensitive adhesive comprising: a) a copolymer of a monomer mixture which contains main monomers comprising from 88 to 100% by weight of an alkyl (meth)acrylate carrying an alkyl group having from 2 to 14 carbon atoms on average and from 12 to 0% by weight of a monoethylenic unsaturated monomer copolymerizable therewith and from 1 to 30% by weight, based on the main monomers, of a monomer having a glass transition point, as a homopolymer, of 0° C. or lower, and having a carboxyl group as a polar group in the molecule; and b) from 10 to 300 parts by weight, per 100 parts by weight of the copolymer, of a heat-conductive filler.

2. An adhesive sheet comprising at least one layer of a heat-conductive and pressure-sensitive adhesive formed on one or both of the surfaces of a heat-conductive base material, said adhesive comprising: a) a copolymer of a monomer mixture which contains main monomers comprising from 88 to 100% by weight of an alkyl (meth) acrylate carrying an alkyl group having from 2 to 14 carbon atoms on average and from 12 to 0% by weight of a monoethylenic unsaturated monomer copolymerizable therewith and from 1 to 30% by weight, based on the main monomers. of a monomer having a glass transition point, as a homopolymer, of 0° C. or lower, and having a carboxyl group as a polar group in the molecule; and b) from 10 to 300 parts by weight, per 100 parts by weight of the copolymer, of a heat-conductive filler.

3. The adhesive sheet as claimed in claim 2, wherein said heat-conductive base material is a plastic film containing an electrical insulating heat-conductive filler.

* * * * *